United States Patent Office
3,703,509
Patented Nov. 21, 1972

3,703,509
UNSYMMETRICAL AZIRIDINYL COMPOUNDS
Andrew Oroszlan, Elmhurst, and Giuliana C. Tesoro, Dobbs Ferry, N.Y., assignors to J. P. Stevens & Co., Inc., New York, N.Y.
No Drawing. Original application Jan. 8, 1962, Ser. No. 165,017, now Patent No. 3,419,566, dated Dec. 31, 1968. Divided and this application Dec. 26, 1968, Ser. No. 810,880
Int. Cl. C07d 23/02, 23/06
U.S. Cl. 260—239 E             2 Claims

ABSTRACT OF THE DISCLOSURE

Unsymmetrical aziridinyl compounds and their use as cross-linking agents for active hydrogen containing polymers in a stepwise reaction.

---

The present application is a divisional of application Ser. No. 165,017 filed Jan. 8, 1962 and now U.S. Pat. 3,419,566.

The invention relates to a new and improved group of polyfunctional reactants and the method of making the same.

The modification of polymeric materials to improve particular properties by treating the materials with a polyfunctional reactant is well known. One example is the cross-linking of linear polymers to form a three-dimensional network. Thus, cellulosic textiles have been cross-linked with polyfunctional sulfones, epoxides, N-methylol amides, and the like, in order to modify the properties of the textiles, including those of dimensional stability, resilience, flat-drying, and the like, which properties are not possessed by the textiles in the unmodified state. All of the cross-linking reagents which have been used to date have similar functional groupings, and thus, while the cross-linking process does permit some control of the extent and rate of the reaction by adjusting concentrations, catalysts, temperatures, and the like, it is generally impossible to exercise sufficient control over the cross-linking reaction because the reactive groups combine with the polymer at similar rates, and a three-dimensional network is formed.

A disadvantage with the modification of polymeric materials, such as the cross-linking of cellulosic textiles to improve their properties, is that the modification must generally be carried out as a last step or treatment to which the polymeric material is subjected. For example, if the cellulosic fibers are cross-linked prior to conversion to yarn, or yarns prior to conversion to fabrics, or even fabrics prior to dyeing, serious difficulties are encountered in subsequent processing steps. If a cellulose solution (e.g. "viscose") is reacted with a polyfunctional cross-linking agent, the resulting gel can no longer be spun into fiber by conventional and most economical means. If cellulosic fibers are cross-linked by reacting with a cross-linking agent, their elongation at the breaking point is severely reduced and the resulting fibers therefore difficult to spin into yarns. Because of the foregoing difficulties, the cross-linking modification of the fibers is usually carried out as a final step after the end product, such as the textile fabric, has been formed and usually after the dyeing of the fabric. Also, because of the foregoing difficulties, the usefulness of the cross-linking processes is limited, their scope restricted, and the modification of the cellulosic fibers must be carried out by the fabric finishers and not by the fiber manufacturers, as would be desirable in some instances.

Accordingly, it is an object of this invention to obviate the present disadvantages and limitations existing in the use of known modifying or cross-linking agents for polymers.

It is an object of this invention to provide new and useful polyfunctional cross-linking agents for treating polymeric materials including cellulosic materials.

Another object of this invention is to provide processes for forming the aforesaid new and useful polyfunctional cross-linking agents.

A specific feature resides in having the unsymmetrical polyfunctional cross-linking agent of the invention contain at least one reactive group which is a vinyl sulfone donor and is reactive at ambient temperatures with the active hydrogen atoms of cellulose and in having the cross-linking agent contain another reactive group which is an oxyethyl group which reacts at higher temperatures, so that substantially complete control over the modification process can be achieved.

Other objects, features, and advantages of the invention will be more apparent from the following disclosure of the invention.

To modify or cross-link polymers having active hydrogen atoms, the polymers are reacted with an unsymmetrical polyfunctional compound of the formula $$X—Q—Y$$

wherein Q is an organic radical, X is a functional group and Y is a functional group which differs from X in structure and reactivity. The reaction takes place under conditions whereby only one functional group reacts with an active hydrogen of the polymer, and subsequently the treated polymer is subjected to a set of reaction conditions wherein the other functional group of the compound reacts with still another active hydrogen of the polymer. When the polymer is a cellulosic material, the compound X—Q—Y can be attached to the cellulose molecules by reaction of the functional group X with the hydrogen in a hydroxyl group of the cellulose molecule under a particular set of reaction conditions. To cross-link the cellulosic material, the treated material is subjected to the particular reaction conditions which enable the functional group Y to react with an active hydrogen of the cellulose molecules. Alternatively, the reaction conditions may be the same but X and Y have the properties of reacting at widely diffeernt rates under such conditions.

It has been found that excellent results are obtained when a polymeric material having active hydrogen atoms is treated with an unsymmetrical, difunctional modifying agent having the formula:

(I) 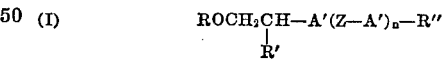

in which
(a) R is selected from the group consisting of hydrogen and lower alkyl,
(b) R' is selected from the group consisting of hydrogen and lower alkyl,
(c) A' is selected from the group consisting of

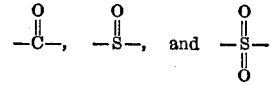

(d) Z is a bivalent organic radical selected from the group consisting of alkylene and, aralkylene.
(e) $n$ is either 0 or 1,
(f) R'' is a member selected from the group consisting of
(a)

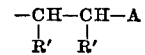

in which A is the aziridinyl residues

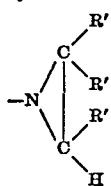

and (b)

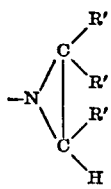

where R' in each of the formulas has the meaning defined above, namely, a member selected from the group consisting of hydrogen and lower alkyl.

Representative compounds coming within the definition of Formula I include

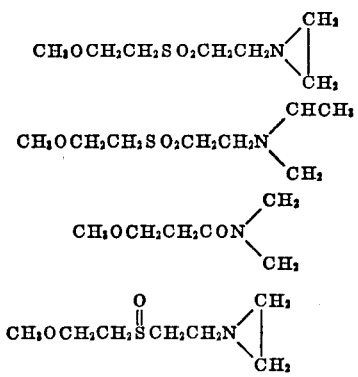

Best results occure when the lower alkyl groups referred to in the aforesaid Formula I contain 1–6 carbon atoms and, preferably, when they contain from 1–4 carbon atoms.

The reaction of the new unsymmetrical compounds with cellulosic fibers is significant since processes for crosslinking the cellulose molecules impart many highly desirable properties to textile materials manufactured from cellulosic fibers.

The compounds in which R and R' are hydrogen can be prepared by the following reactions:

(4)
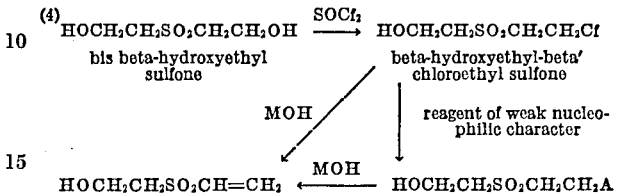

A represents the residue derived from a reagent of weak nucleophilic character. MOH is preferably an alkali metal hydroxide, but any alkaline compound having a dissociation constant greater than about $10^{-5}$ will be satisfactory in the aforesaid reaction.

As is evident from the foregoing equation, the bis-beta-hydroxyethyl sulfone in the presence of $SOCl_2$ is converted to beta-hydroxyethyl-beta' chloroethyl sulfone. When the latter compound is reacted with a reagent having a weak nucleophilic character, such as an alkali metal thiosulfate, the following compound is formed:

(V)     $HOCH_2CH_2SO_2CH_2CH_2SSO_3Na$

When the beta-hydroxyethyl-beta' chloroethyl sulfone is reacted with pyridine, it forms a pyridinium chloride derivative, having the following formula:

(VI)     $HOCH_2CH_2SO_2CH_2CH_2NC_5H_5$
                                          |
                                         Cl

Likewise, the beta-hydroxyethyl-beta' chloroethyl sulfone can be reacted with other compounds to convert it to other saturated derivatives of polar character.

The compounds wherein R is a lower alkyl group and R' is hydrogen or lower alkyl can be prepared by the following reactions.

(5)
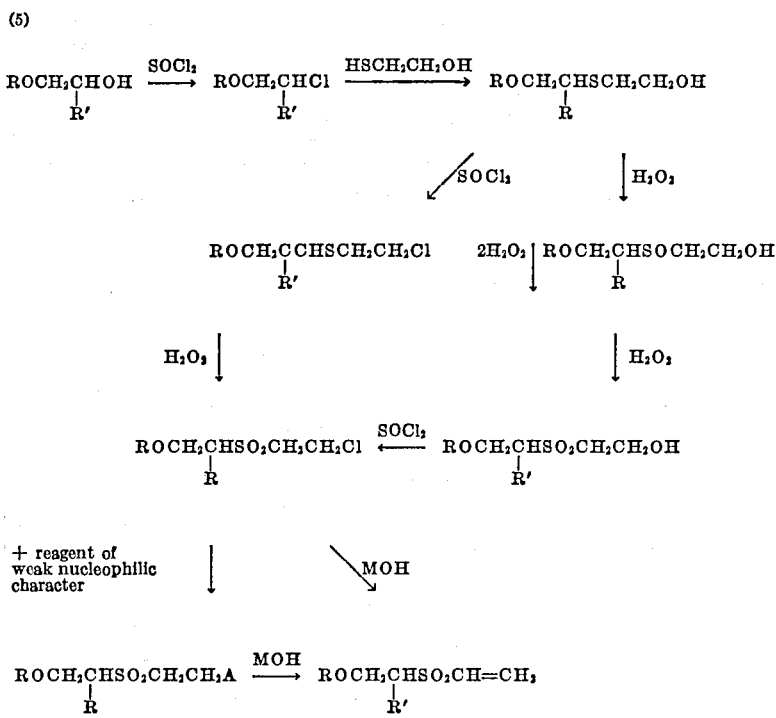

Also included among the novel compounds of the invention are the following:

(VII) 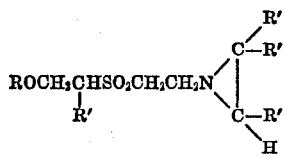

ROCH₂CHSO₂CH₂CH₂N⟨...⟩
           |
           R' in which R is selected from the group consisting of hydrogen, lower alkyl and lower acyl, R' is a member selected from the group consisting of hydrogen and lower alkyl. The compounds of Formula VII can be prepared either from the compounds of Formula III by addition of a three-membered heterocyclic imino compound as shown by way of example in Equation 7.

(7) 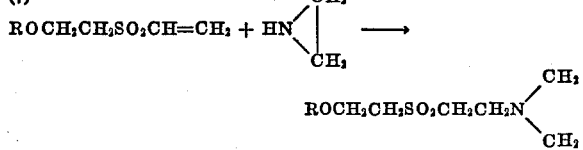

ROCH₂CH₂SO₂CH=CH₂ + HN⟨CH₂/CH₂⟩ ⟶ ROCH₂CH₂SO₂CH₂CH₂N⟨CH₂/CH₂⟩ or they can also be prepared by reacting the corresponding beta-haloethyl sulfonyl compounds with three-membered heterocyclic imino compounds under suitable reaction conditions.

Included among the compounds of generic Formula I are also unsymmetrical aziridinyl compounds corresponding to Formulas X and X-a (X) 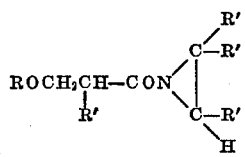

ROCH₂CH—CON⟨...⟩
       |
       R'

(X-a) 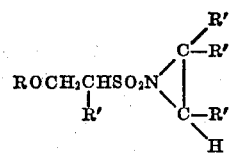

ROCH₂CHSO₂N⟨...⟩
       |
       R' and prepared by reacting the cyclic imine with the appropriate acid halide as shown in Equations 9 and 10 (for the chloride) in the presence of a suitable acid acceptor.

(9) 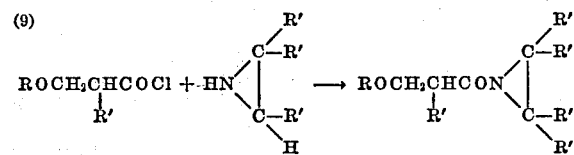

ROCH₂CHCOCl + HN⟨...⟩ ⟶ ROCH₂CHCON⟨...⟩
       |                        |
       R'                       R'

(10) 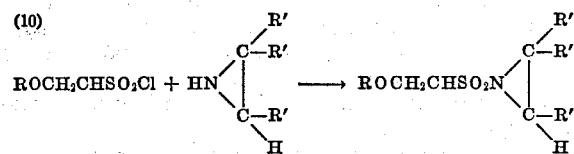

ROCH₂CHSO₂Cl + HN⟨...⟩ ⟶ ROCH₂CHSO₂N⟨...⟩

It is apparent from the above discussion that a large number of unsymmetrical reagents coming within the scope of the generic Formula I are included in the scope of the present invention. For other compounds, for example those in which the grouping R″ is —CH—CH—A
  |    |
  R'   R' 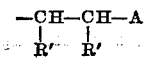

where A is iziridinyl

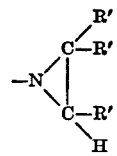

or those in which the grouping R″ is aziridinyl, the two steps of the cross-linking process are both carried out under essentially anhydrous conditions at elevated temperature, but one functional group is reacted under alkaline conditions, while the second is reacted under acidic conditions.

Thus, the processing condition required to carry out the stepwise cross-linking employing the unsymmetrical reagents of the present invention depend on the chemical structure of the reagent selected.

The following examples are merely illustrative of the features of the invention, but are not to be considered limiting in any manner with respect to the scope of the invention.

EXAMPLE 1

Preparation of 2 chloroethyl 2'hydroxyethyl sulfone

$HOCH_2CH_2SO_2CH_2CH_2Cl$ 154 grams (1 mol) of anhydrous bis-(2-hydroxyethyl) sulfone were dissolved in 500 g. of dimethyl ether of ethylene glycol and 79 g. (1 mol) of pyridine were added thereto. 95 g. (0.8 mol) of thionyl chloride were then added with stirring and cooling. The temperature was maintained at 40–45° C. and the addition took 50 minutes. The mixture was then refluxed for 30 minutes at 82–85° C.

The reaction mixture was poured into water, and the organic phase was separated. The organic phase was then dried over $Na_2SO_4$ and the solvent was removed by distillation, leaving 66 grams of crude product in the form of a brown liquid.

Analysis:

Total chloride: 17.7% (determined by hydrolysis)
Free chloride: 2.48% (determined by $AgNO_3$ titration)
Bound chloride: 15.22% (by difference)
Calcd. chloride: 20.70%
Purity of crude produce: 74%

Although higher yields of product could be obtained by increasing the mol ratio of SOCl to bis-(2 hydroxyethyl) sulfone, this resulted in contamination of the product by bis(2-chloroethyl) sulfone, which was separated with great difficulty. The product prepared by the procedure outlined in Example 1 on the other hand, was contaminated only by unreacted bis-(2 hydroxyethyl) sulfone which was readily removed in subsequent steps.

EXAMPLE 2

Preparation of 2 hydroxyethyl sulfonyl ethyl pyridinium chloride

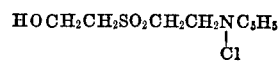

$HOCH_2CH_2SO_2CH_2CH_2NC_5H_5$
                               |
                               Cl 69 grams (0.4 mol) of 2 chloroethyl 2'hydroxyethyl sulfone, 28 grams (0.4 mol) of pyridine, and 150 grams of isopropanol were refluxed with stirring at 88–92° C. for 12 hours. A tan solid precipitated in the course of reaction, indicating that essentially all of the organic chloride which was present was converted to ionic chloride. The solvent layer was decanted, and the precipitate was washed with acetone and ether on a filter. 61 grams of light tan crystalline product were obtained.

Analysis:

Chloride found: 14.25% (by AgNO titration)
Calcd. chloride: 14.10%
Equivalent weight: found, 248; calcd., 251.5

The equivalent weight was determined by electrometric titration with standard NaOH solution (end pt: pH 10.5).

EXAMPLE 3

Preparation of 2 methoxyethyl chloride $$CH_3OCH_2CH_2Cl$$

190 grams (2.5 mols) of 2 methoxyethanol and 216.7 grams (2.75 mols) of pyridine were diluted with 100 grams of ethylene glycol dimethyl ether. 327.8 grams (2.75 mols) of thionyl chloride were then added with stirring over a period of two hours. The temperature was maintained below 50° C. by means of a cooling bath. After addition of the $SOCl_2$ the mixture was heated to reflux and stirred at 80–85° C. for 30 minutes. The reaction mixture was poured onto 1000 g. of crushed ice and the water layer was separated. The organic layer was washed twice with 100 ml. of cold water, dried over $Na_2SO_4$ and distilled. B.P. 85–90° C. (at atmospheric pressure).

Analysis:

Bound chloride: 36.9%
Calcd. chloride: 37.5%
Purity: 98.5%

The distillate weighed 214 grams, corresponding to a yield of 89.5% of the theoretical.

EXAMPLE 4

Preparation of 2 methoxyethyl 2' hydroxyethyl sulfide $$CH_3OCH_2CH_2SCH_2CH_2OH$$

273 grams (3.5 mols) of 2-mercaptoethanol were added to 140 grams (3.5 mols) of sodium hydroxide dissolved in 300 grams of ethanol. 331 grams (3.5 mols) of 2 methoxyethyl chloride were added dropwise with stirring under a blanket of nitrogen over a period of 5 hours. The temperature was kept below 40° C. After the addition was completed, the mixture was stirred an additional 3 hours. The precipitated sodium chloride was filtered off, and ethanol and water were removed by stripping under reduced pressure. The product was then distilled. B.P.: 104–107° C. at 6 mm. The distillate was a colorless liquid.

Analysis:

Sulfur found: 23.2%
Calcd. 23.5%

The distillate obtained weighed 381 grams, corresponding to a yield of 80% of the theoretical.

EXAMPLE 5

Preparation of 2 methoxyethyl 2' hydroxyethyl sulfone $$CH_3OCH_2CH_2SO_2CH_2CH_2OH$$

200 grams (1.47 mols) of 2 methoxy-2'-hydroxyethyl sulfide (product of Example 4) were charged in a reaction vessel, and 2 grams of 85% phosphoric acid were added. 137 grams (1.41 mols) of 35% aqueous hydrogen peroxide were added dropwise with stirring over a period of 90 minutes and the temperature was maintained below 55° C. by means of a cooling bath. The mixture was then heated to reflux, and another portion of 137 grams of 35% hydrogen peroxide was added over a period of 60 minutes at 100–107° C. The mixture was then refluxed for 12 hours or until a test for residual hydrogen peroxide was negative. The water was removed under reduced pressure at 17 mm. to a pot temperature of 105° C.

The product was obtained as a light yellow liquid which weighed 200 grams of contained only a very small amount of oxidizable sulfur (0.25%). The yield was 89.5% of the theoretical.

EXAMPLE 6

Preparation of 2 methoxyethyl 2' chloroethyl sulfone $$CH_3OCH_2CH_2SO_2CH_2CH_2Cl$$

50.4 grams (0.3 mol) of 2 methoxyethyl 2' hydroxyethyl sulfone (product of Example 5) were dissolved in 29 grams (0.33 mol) of pyridine, and 43.5 grams (0.33 mol) of thionyl chloride were added dropwise while stirring, over a period of 60 minutes at a temperature not exceeding 40° C. The mixture was heated to 70° C. and kept at 70° C. for 30 minutes. After cooling to room temperature, the reaction mixture was poured on to a saturated sodium chloride solution (in water), and extracted with dimethyl ether of ethylene glycol three times using 100 ml. of the ether for each extraction. After separating and drying the organic phase, the solvent was removed under reduced pressure, and the residue was distilled. B.P.: 131–132° at 1.0 mm. The product was a pale yellow liquid obtained in 40% yield.

Analysis:

Bound chloride: found, 18.9%; calcd., 19.05%.
Methoxyl content: found, 16.65%; calcd., 16.62.

EXAMPLE 7

Preparation of 2 methoxyethyl sulfonyl ethyl pyridinium chloride $$CH_3OCH_2CH_2SO_2CH_2CH_2NC_5H_5$$
$$|$$
$$Cl$$

200 grams (1.07 mols) of 2 methoxyethyl-2' chloroethyl sulfone (product of Example 6) were mixed with 250 grams of isopropanol and 85 grams (1.07 mols) of pyridine, and refluxed for 6 hours at 80–90° C., at which time essentially all of the organic chloride present was converted to ionic chloride. This isopropanol was removed under reduced pressure, and the crystalline residue was washed with acetone and ether on a filter.

The weight of the white crystalline product so obtained was 262.8 grams, corresponding to a yield of 91% of the theoretical.

Analysis:

Chloride content: found, 12.2%; calcd., 13.3%.
Equavalent weight: found, 288; calcd. 266.5.

The equivalent weight was determined by electrometric titration with a standard NaOH solution.

EXAMPLE 8

Preparation of 2 methoxyethyl, 2' thiosulfatoethyl sulfone $$CH_3OCH_2CH_2SO_2CH_2CH_2SSO_3Na$$

93.2 grams (0.5 mol) of 2 methoxyethyl 2'- chloroethyl sulfone (product of Example 6) were mixed with 93 grams of ethanol, and a soltuion of 124 grams (0.5 mol) of sodium thiosulfate pentahydrate in 124 grams of water was added. The mixture so obtained was refluxed with stirring for 4 hours, until essentially all of the organic chloride was converted to ionic chloride. The reflux temperature of the mixture was 80–90° C. After the refluxing, 100% conversion was achieved, as indicated by titration for free thiosulfate ion. The reaction product was not isolated in crystalline form, but the ethanol was distilled off and the residual aqueous solution was analyzed as follows:

Calculated concentration of product from the weight of aqueous solution obtained: 42.8%.

Concentration determined from the amount of sodium hydroxide consumed in alkaline hydrolysis: 43.1%.

Concentration determined from the amount of sodium thiosulfate liberated in alkaline hydrolysis with sodium hydroxide: 39.9%.

EXAMPLE 9

Preparation of 2 methoxyethyl vinyl sulfone

46.4 g. (0.25 mol) of 2 methoxyethyl 2' chloroethyl sulfone (product of Example 6) were added dropwise with continuous stirring to a solution containing 26.0 g. (0.25 mol) of triethylamine and 100 g. of ethylene glycol dimethyl ether. External cooling was necessary in order to maintain the temperature at 25°–30° C. The addition required 40 minutes. An additional hour of stirring at room temperature was necessary to reach 80% conversion after the addition of the chloride was completed. The triethylamine hydrochloride which precipitated was filtered off and the solvent was removed under reduced pressure. The residue was vacuum distilled. B.P.: 96.98° C. at 1 mm. Yield of distilled product: 29.0 g. corresponding to 77.5% of the theoretical. $n_D^{20}$=1.4659. Vinyl content: 17.85% (calcd.: 18.0%).

EXAMPLE 10

Preparation of 2 methoxyethyl 2' aziridino ethyl sulfone

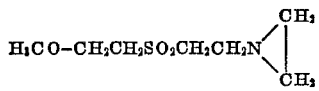

29.0 g. (0.19 mol) of 2 methoxyethyl vinyl sulfone (product of Example 9) were added to 13.2 g. (0.3 mol) of ethylene imine keeping the temperature at 29–30° C. by cooling with an ice bath. The time of the addition was 25 minutes, and stirring for 60 minutes at room temperature after completing the addition was sufficient to achieve complete reaction. The excess ethylene imine was distilled off and the residual yellow liquid weighed 35.1 g. The equivalent weight determined by titration with standard acid was 208 (calcd.: 193). The equivalent weight determined by thiosulfate titration (described in JACS 77, 5918–22 (1955) was 211. The yield of product was 88.6% of the theoretical.

EXAMPLE 11

Reactions of 2-methoxyethyl 2'aziridinoethyl sulfone (product of Example 10) with cotton fabric Samples of 80 x 80 cotton print cloth were padded with the following aqueous solutions on a laboratory padder:

Solution (A) containing 15% of the product of Example 10 +3.9% KHCO₃

Solution (B) containing 15% of the product of Example 10 +7.8% KHCO₃

Solution (C) containing 7.5% of the product of Example 10 +3.9% KHCO₃

The wet pickup was 95% for solutions (A) and (B) and 88% for solution (C) corresponding to 14.2 and 6.6% reagent respectively (based on the weight of the fabric). The samples were dried at 50° C. and cured for 3 minutes at 150° C., then thoroughly washed with distilled water. The weight increase for the above samples was: for sample (A), 7.9% (67% yield); (B), 7.4% and (C), 4.0% (73% yield). After this treatment the cellulose contained the side chain reaction product.

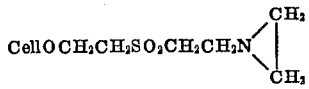

Cross-links were formed by treating portions of samples (A) and (C) with 0.8% and 0.4% solutions of zinc fluoroborate respectively, drying at 80° C., curing for 5 minutes at 150° C., and washing. The acid catalyzed step induced opening of the aziridine ring, and formation of a cross-linked product CellOCH₂CH₂SO₂CH₂CH₂NHCH₂CH₂OCell which exhibited greatly enhanced crease recovery over the side chain reaction product formed in the alkali catalyzed first step.

Furthermore, in Formula I, supra, it will be understood that the alkylene group includes methylene, ethylene, butylene, octylene, decamethylene, etc., while the aralkylene group includes —CH₂C₆H₄CH₂—,

—C₂H₄C₆H₄C₂H₄—

—C₃H₆C₆H₄C₃H₆—, —CH₂C₆H₃(CH₃)CH₂—, and the like.

We claim:

1. A compound having the formula

wherein

R is lower alkyl,

R' is a member selected from the group consisting of hydrogen and lower alkyl,

A' is a member selected from the group consisting of

R" is (a)

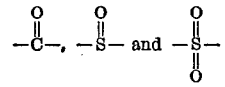

or (b)

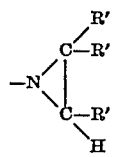

wherein R' in each of the formulas has the meaning defined above.

2.

References Cited

UNITED STATES PATENTS 2,269,997   1/1942   Berchet _____ 260—239
2,626,931   1/1953   Bestian _____ 260—78.4

FOREIGN PATENTS 1,010,063   11/1957   Germany _____ 260—239

ALTON D. ROLLINS, Primary Examiner